Nov. 24, 1931.                B. CREVISTON                1,833,870
                               PULVERIZER
                            Filed July 9, 1930
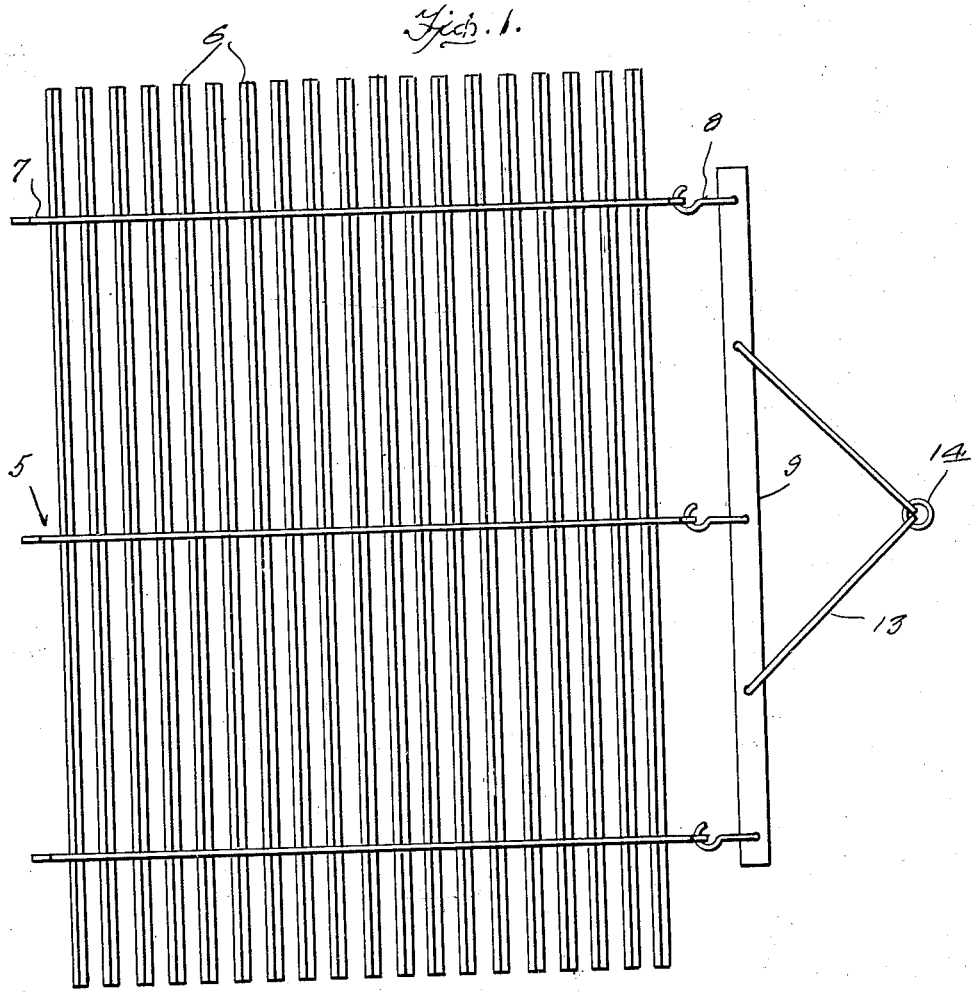
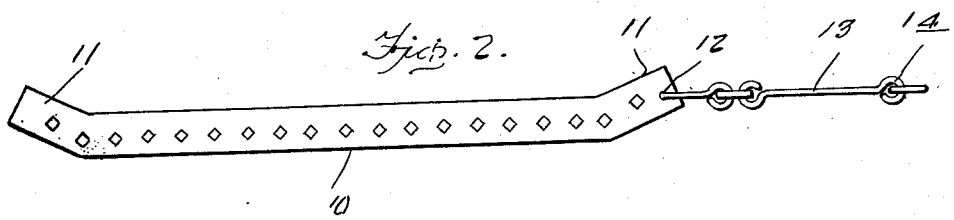
Inventor
B. Creviston
By Clarence A. O'Brien
                Attorney Patented Nov. 24, 1931

1,833,870

UNITED STATES PATENT OFFICE

BARNEY CREVISTON, OF LIMA, OHIO

PULVERIZER

Application filed July 9, 1930. Serial No. 466,805.

This invention relates to pulverizers or clod crushers adapted to be horse-drawn or motor propelled over broken or plowed ground to pulverize or crush the clods and reduce the ground to a level condition.

It is the object of this invention to provide a pulverizer of the kind stated which is extraordinarily efficient and durable, and which attains said efficiency and durability by its novel and improved construction, and which is at the same time simple and inexpensive to manufacture.

Other objects and advantages of my invention will appear as the nature thereof is better understood from the accompanying description of the appended drawings, in which:—

Figure 1 is a top plan view.

Figure 2 is a longitudinal side elevation.

It is to be understood that I do not limit the application of the invention to the precise embodiment used in illustration herein, but any change or changes may be made consistent with the scope of the invention.

Referring in detail to the drawings, it is seen that the pulverizer generally designated by the reference numeral 5 is composed of a plurality of bars 6 arranged in spaced parallelism and positioned by longitudinal cross members 7, at either end of which may be attached draft hooks 8, attached to an adequate draft bar 9. It will be evident from Figure 2 that the bars 6 are of square cross section and that they are positioned in the cross members 7 at an angle of approximately 45 degrees from the horizontal so that they present a sharp edge to the ground. This angle has been used to make possible one of the outstanding advantages inherent in the invention, namely, that it may be drawn from either end and passed over the ground in either direction and the alternate use of the device in either direction previous and enhances the cutting edges mentioned.

The cross members 7 as seen in Figure 2 are flat pieces placed on end thin edge, and this arrangement prevents undesirable skidding and consequent uneven and ununiform work by providing a series of "runners" which maintain the device on a constant course. These cross members are composed of a straight bar-like portion 10 and angularly offset portions 11 which portions form the meeting front of the pulverizer as it is drawn over the ground. It will be observed that these end portions 11 are symmetrical at each end. It will also be observed that the bars 6 are positioned to follow the contour of the cross-members, thus one or more bars are raised somewhat above its companions at either end and provide for the devices raising themselves upon the clods as they are met, and the succeeding bars pulverize and crush the clods and thus level the ground passed over. It has been stated that the pulverizer herein described may be drawn from either end and I have provided the features enumerated immediately above to facilitate an equal efficiency when it is drawn from either end. Holes 12 in the ends 11 provide for engagement of the draft means at either end to draw the same in either direction or from either end. The draft bar 9 is a flat bar having the hooks 8 swivelly mounted at each end and at intermediary points as required, and has draft links 13 loosely pivoted at points within and equally spaced from the ends of the draft bar, the free ends of the links being assembled in a ring 14 for immediate attachment to the draft means.

The bars and cross members are preferably made of iron or steel for obvious reasons and to provide sufficient weight for effective operation, though the device may be made of other suitable materials suitably weighted.

It will now be understood that I have invented a new, novel and improved pulverizer exceptionally effective, efficient, and durable, and embodying features of construction and arrangement of parts leading to said improvement in devices of the kind not hitherto known in the art.

What is claimed is:—

1. A clod pulverizer comprising a plurality of parallel spaced square metal bars, a plurality of transversely spaced runners having upturned ends, said bars being rigidly secured through said runners with their faces in angular relation to the horizontal at points intermediate the upper and lower edges of the runners, said pulverizer being adapted to be drawn over the ground in either direction.

2. A clod pulverizer of the type described comprising a plurality of longitudinally disposed runners having at their ends means for securing draft means thereto, and a plurality of transverse square bars rigidly secured intermediate the upper and lower edges of the runners.

3. A clod pulverizer of the type described comprising a plurality of longitudinally disposed relatively thin runners having upwardly and angularly directed end portions provided with holes for attaching a draft means thereto, and a plurality of transverse bars of diamond cross section rigidly secured through the runners intermediate the upper and lower edges of the runners.

4. A pulverizer consisting of a grid of closely spaced diamond shaped metal bars, a plurality of narrow metal bars turned up at their ends and disposed on one edge to act as runners, said diamond shaped bars being passed through said runners and rigidly secured therein at points approximately equidistant from the upper and lower edges thereof.

5. As a new article of manufacture a clod crusher consisting of an integral grid composed of closely spaced parallel diamond shaped rods, a plurality of narrow flat metal bars turned up at their ends and disposed on one edge to engage the ground as runners, said rods being rigidly secured through said bars at points approximately equidistant from the upper and lower edges thereof.

In testimony whereof I affix my signature.

BARNEY CREVISTON.